(No Model.)

H. C. HART.
MANUFACTURE OF HOLLOW HANDLED ARTICLES.

No. 417,244.   Patented Dec. 17, 1889.

Witnesses.
John Edwards Jr.
H. H. Whiting

Inventor.
Hubert C. Hart,
By James Shepard
Atty.

UNITED STATES PATENT OFFICE.

HUBERT C. HART, OF UNIONVILLE, CONNECTICUT.

MANUFACTURE OF HOLLOW-HANDLED ARTICLES.

SPECIFICATION forming part of Letters Patent No. 417,244, dated December 17, 1889.

Application filed October 21, 1889. Serial No. 327,693. (No model.)

*To all whom it may concern:*

Be it known that I, HUBERT C. HART, a citizen of the United States, residing at Unionville, in the county of Hartford and State of Connecticut, have invented certain new and useful Improvements in the Manufacture of Hollow-Handled Articles, of which the following is a specification.

My invention relates to improvements in the manufacture of hollow-handled articles— as, for instance, table-cutlery; and the objects of my invention are economy in production and to reduce as far as possible the length of the line of union in welding or brazing.

Figure 1:
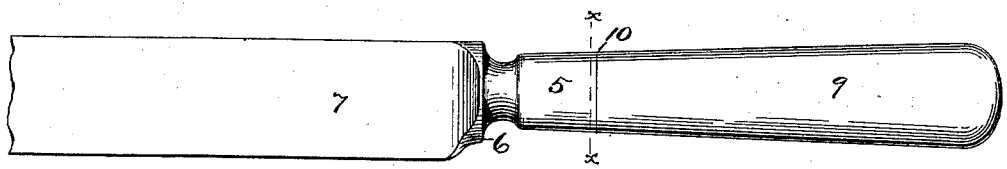
Figure 2:
Figure 3:
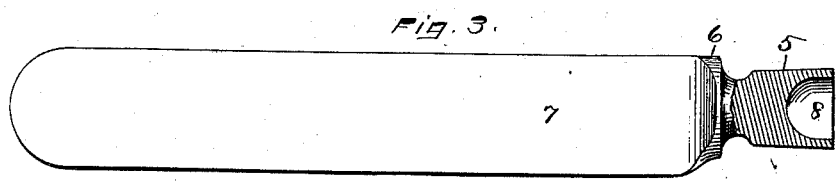
Figure 4:
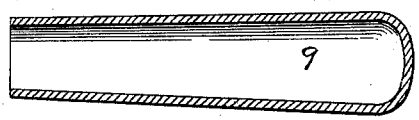

In the accompanying drawings, Figure 1 is a side elevation of a knife-handle and principal portion of a knife which is made in accordance with my invention. Fig. 2 is a transverse section of the same on the line $x$ $x$ of Fig. 1. Fig. 3 is a side elevation, partly in longitudinal section, of the blade and rudimentary handle, and Fig. 4 is a longitudinal section of the major portion of the handle.

I first form a rudimentary handle or stub, as at 5, Fig. 3, upon one end of which may be formed the usual bolster 6, of any desired form, and upon one side of which may be the blade-blank or blade 7. This rudimentary handle or stub 5 is recessed or cupped out at one end, as at 8, so as to form at that end a mere shell. This cupped portion may be formed by drilling out, or it may be formed by means of suitable dies. I also provide a hollow handle—as, for instance, the handle 9—which constitutes the major portion of the handle, and which may be formed by any known process—as, for instance, by drawing up from a single piece of metal. These parts are both formed or dressed so as to be square across their ends, and the hollow or open end of the handle 9 is abutted against the hollow end of the stub 5, and the two are then welded or brazed together, the line of union being transversely to the handle, as indicated by the line 10 in Fig. 1.

While the handle and stub may be brazed or welded together in any ordinary manner, it is particularly adapted for electrical welding, and I intend to so weld them. By my process of manufacture the line of union is reduced to the minimum, and the blade may, if desired, be wrought into its final form and substantially finished before the welding or brazing is done.

I claim as my invention—

That improvement in the manufacture of hollow-handled articles which consists of first forming a rudimentary handle made hollow at its end, and a hollow handle, and then uniting said handle and stub by abutting their hollow ends together and welding or brazing, substantially as described, and for the purpose specified.

HUBERT C. HART.

Witnesses:
GEORGE E. TAFT,
CHARLES E. HART.